United States Patent Office 3,558,454
Patented Jan. 26, 1971

3,558,454
METHOD OF REGULATING VOLTAGE AND ELIMINATING SHORT CIRCUITS IN CELLS FOR THE ELECTROLYSIS OF ALKALI METAL CHLORIDES
Rolf Schäfer, Krefeld-Urdingen, Wilm Reerink, Heribert Schaffrath, and Karl-Heinrich Schmitt, Krefeld-Bockum, and Arthur Terlinden, Rheinhausen, Germany, assignors to Farbenfabriken Bayer Aktiengesellschaft, Leverkusen, Germany, a corporation of Germany
Filed June 26, 1968, Ser. No. 740,200
Claims priority, application Germany, July 4, 1967, 1,567,955
Int. Cl. C01b 1/08
U.S. Cl. 204—99     5 Claims

ABSTRACT OF THE DISCLOSURE

Method of regulating voltage and eliminating short circuits between electrodes in cells used for electrolysis of alkali metal chloride, by the steps of establishing a reference voltage derived from a component uneffected by load and a component proportional to the electrolysis current of the cell such that the reference voltage simulates the cell voltage throughout the entire load range, continuously comparing automatically the cell voltage with the reference voltage, and adjusting the cell voltage in dependence upon deviations from the reference voltage.

---

Figure 1:
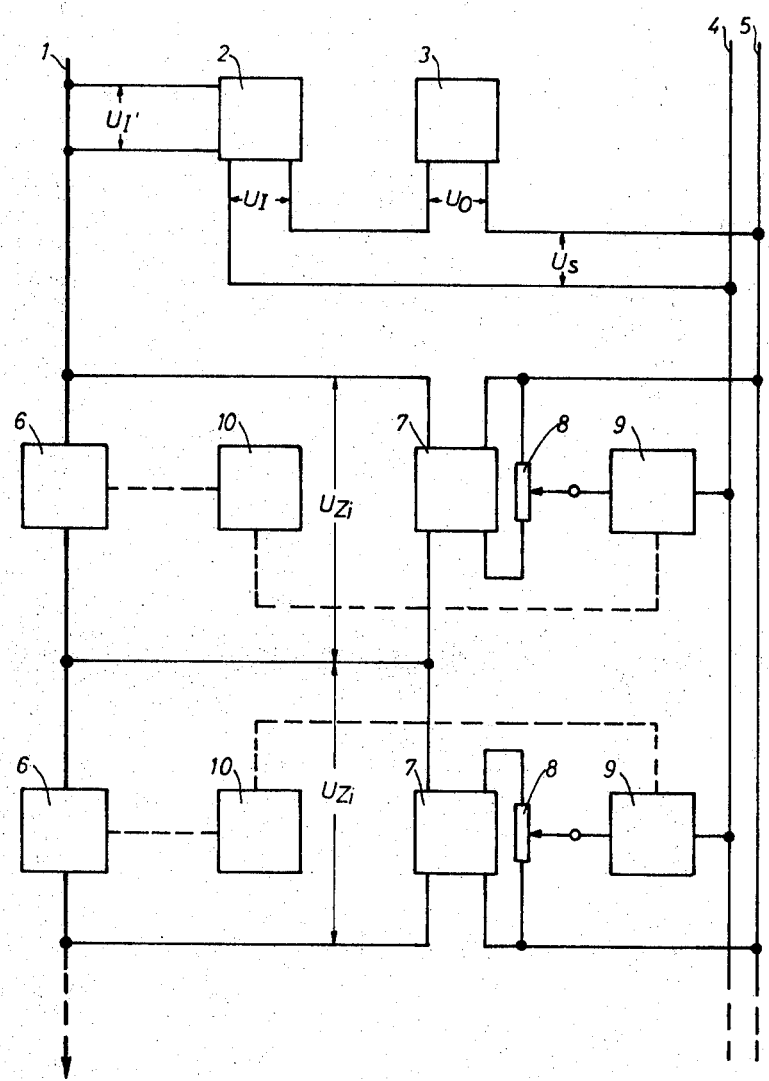
Figure 2:
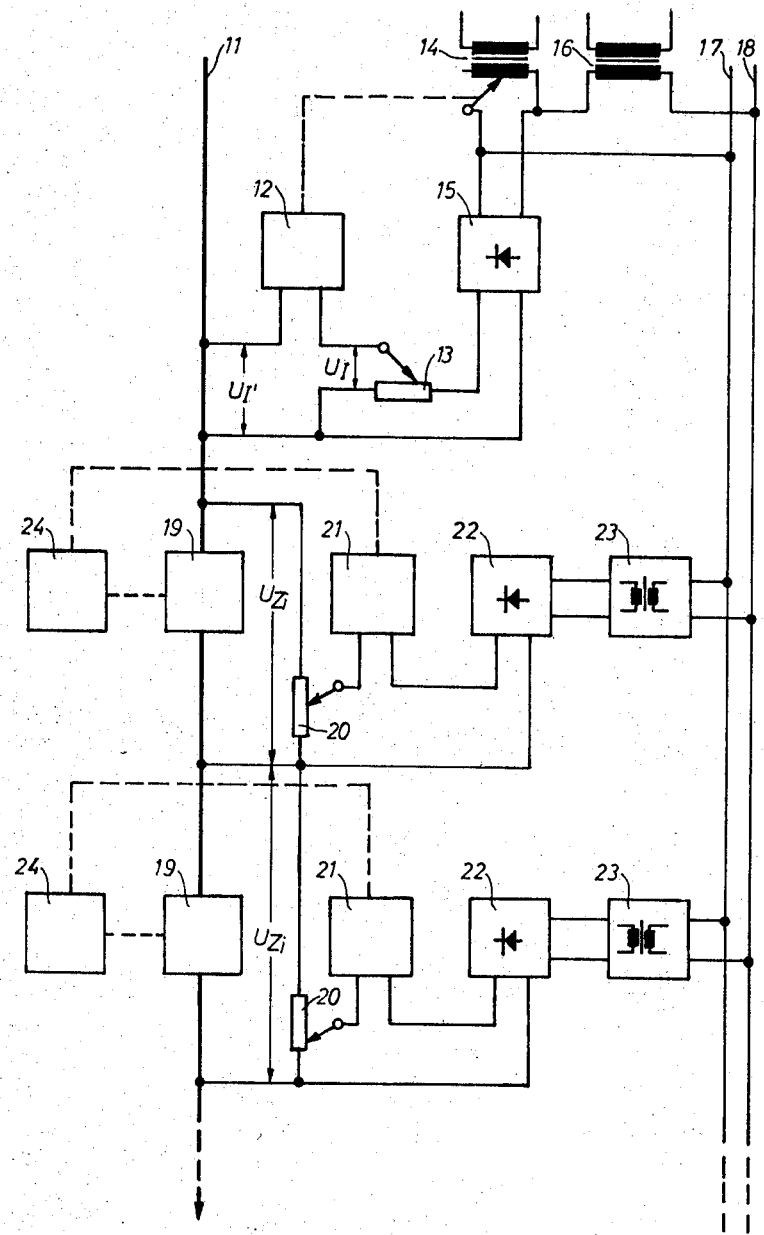
Figure 3:
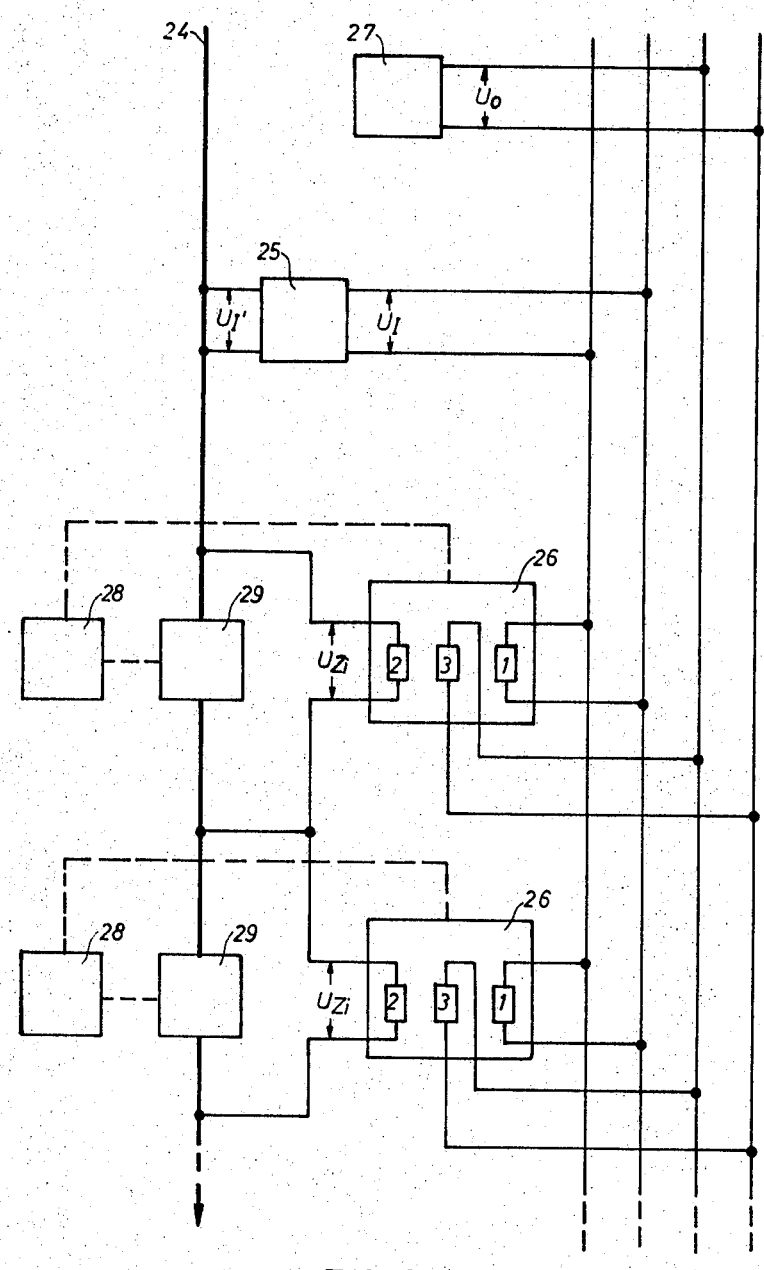

The cell voltage of an electrolysis cell for the electrolysis of alkali metal chlorides is essentially governed by two factors: the specific load and the electrode spacing. All the other parameters that also influence the cell voltage such as temperature, salt content and sol deprivation, are kept largely constant. The cell voltage should be as low as possible for economic reasons. However, the narrower the anode spacing and hence the lower the cell voltage under a certain load, the more frequenly short circuits occur, in which case the cell voltage breaks down to a greater or lesser extent. The short circuits have to be eliminated as quickly as possible to prevent greater damage to the cells. Accordingly, any method for automatically regulating voltage should also make it possible to signal and to eliminate short circuits. This is the case with the method according to the invention. The obvious prerequisite is that it should be possible to move the many anodes of one cell up and down together through an adjustment system.

Methods for signalling short circuits are already known. One such method, which also allows for load changes in the cells, is described in Austrian patent specification No. 243,826. A bleeder chain with as many resistances as the cells, across which the electrolysis voltage falls is parallel with the series-connected electrolysis cells. Each individual cell voltage is compared with the voltage falling across the associated resistance through a cross-coil voltmeter which indicates the difference in voltage. If the installation as a whole is affected by a short circuit, the indicators of all the instruments remain in the zero position. In the event of a short circuit, the indicator of the voltmeter concerned will be deflected, releasing an alarm through a signal contact. Unfortunately, this process is not suitable for automatically regulating cell voltage. Since the same voltage falls across the cell circuit and across the bleeder chain, the instruments of those cells that are not affected by a short circuit must be deflected to the other side in the event of a short circuit because the sum of the indicator deviations, added true to sign, must of course always come to zero. In other words, all the other cells simulate an excessively high voltage and their anodes would be automatically lowered. This means, however, that even more short circuits would occur.

The method according to the invention is free from these disadvantages, being based upon the comparison of the cell voltage with a refererence voltage through a three-point switch, for example a galvanometric relay, an electronic comparison circuit or a magnetic sweep amplifier.

In principle, the reference voltage can be generated through a voltage source and a potentiometer and, in the event of a change in load, may be manually adjusted to the correct level because the average cell voltage for each load is known. Unfortunately, an arrangement of this kind has serious disadvantages. If the potentiometer is inadvertently neglected in the event of an increase in load, or if the desired value is inadvertently set too low, all the cells begin with the electrode lowered so that they might all be short-circuited. Although it would be possible to obviate the disadvantages referred to above by mechanically coupling the reference voltage potentiometer with a unit controlling the electrolysis current, the success of this process on a practical scale would be governed by the special design features of a rectifier installation.

It has now been found that a sufficiently accurate reference voltage, which is automatically adjusted for the entire load range, can be obtained from any quantity that is proportional to the electrolysis current. This process may be generally applied irrespective of the special design features of an electrolysis plant. It is an essential part of the invention that the reference voltage is derived by superposition from a constant component and a component that is proportional to the load.

The fall in voltage across any section of the rails carrying the electrolysis current is governed solely by the load and increases proportionately to the load. Accordingly, it is dependent above all upon whether individual cells have short circuits or whether they have been disconnected for maintenance purposes. If the tapped value of the fall in voltage is amplified to the current value and if the polarisation voltage of one electrolysis cell is added thereto, both the cell voltage and the reference voltage are equal in value throughout the entire load range.

Various circuits may be used of which three are shown in detail in the accompanying circuit diagrams.

CIRCUIT DIAGRAM 1

The voltage $U_I'$ tapped at the conductor rail 1 in circuit diagram 1 is amplified in the amplifier 2 to the value $U_I$, and galvanically separated from the conductor rail potential. The constant voltage $U_o$ is added to it through the constant voltage source 3. If $U_o$ and $U_I$ are appropriately selected, the sum $U_o + U_I$ represents the required reference voltage $U_s$ The voltage $U_s$ is applied to the bus bars 4 and 5. The cell voltage $U_{zi}$ of the cells 6 is fed through a buffer amplifier 7 to a voltage divider 8 through which the cells are individually adapted. The three-point switch 9 compares the voltage tapped at 8 with the reference voltage $U_s$ and through the positions "lift, rest and lower" controls the drive 10 for adjusting the electrodes. One component of the reference voltage $U_s$ is freely selectable, the polarization voltage of the alkali metal chloride cell being preferably used for the constant voltage $U_o$.

CIRCUIT DIAGRAM 2

The voltage drop $U_I'$ tapped at the conductor rail 11 in circuit diagram 2 is compared through a servo amplifier 12 with the voltage $U_I$ across the voltage divider 13. The voltage divider 13 is fed from the variable-ratio transformer 14 through the rectifier 15. The servo-amplifier 12 adjusts the tap of the transformer 14 until $U_I = U_I'$.

The A.C. voltage adjusted in the transformer 14 is added in phase to a constant A.C. voltage from the transformer 16 and applied to the bus bars 17 and 18. The transformers 14 and 16 may also be combined to form a single unit. The cell voltage $U_{z1}$ of the cells 19 is fed to a voltage divider 20. The three-point switch 21 compares the voltage tapped at 20 with the voltage from the rectifier 22. The rectifier 22 is fed from the bus bars 17 and 18 through the variable-ratio transformer or capacitors 23 and galvanically separated. The three-point switch 21 again produces the control signals for the drive 24 of the electrode adjusting system. The choice of the components for the A.C. voltage from the transformers 14 and 16 which give the reference voltage $U_s$ is governed by the same factors as in Example 1.

CIRCUIT DIAGRAM 3

The voltage $U_I'$ tapped at the conductor rail 24 in circuit diagram 3 is amplified in the buffer amplifier to the value $U_I$ and at the same time galvanically separated from the conductor rail potential and fed to the winding 1 of the magnetic sweep amplifier 26. The voltage $U_0$ of the constant voltage source 27 is applied to the winding 3 wound in the same direction as the winding 1. The magnetic fields of the windings 1 and 3 are added together. The cell voltage $U_{z1}$ is applied to the winding 2 wound in the opposite direction to the windings 1 and 3. If the magnetic fields of the windings 1 and 3 are in equilibrium with the winding 2, the three-point switch of the magnetic sweep amplifier 26 remains at rest. The relay is actuated in one direction or the other, depending on which of the fields is overcome. This means that the following driving motor 28 for adjusting the electrodes is ordered to rest, to lift or to lower the electrodes. Naturally, it is also possible to add the constant voltage $U_0$ to the load-proportional voltage as described in Examples 1 and 2. The comparison voltage $U_s$ is then applied to a winding of the magnetic sweep amplifier which in this case can be more simply designed.

We claim:
1. A method of regulating voltage and eliminating short circuits between the electrodes in a cell electrolyzing alkali metal chloride, which comprises establishing a reference voltage derived from a component uneffected by load and a load-proportional component which is proportional to the electrolysis current of the cell such that the reference voltage simulates the cell voltage throughout the entire load range, continuously comparing automatically the cell voltage with said reference voltage, and adjusting the cell voltage in dependence upon deviations from the reference voltage.
2. Method according to claim 1 wherein the load-proportional component of said reference voltage is derived from the drop in voltage across any section of the conductor carrying the electrolysis current.
3. Method according to claim 1 wherein the load-proportional component of said reference voltage is derived by measuring the entire electrolysis current.
4. Method according to claim 1 wherein said cell voltage is adjusted by changing the gap between the electrodes of said cell.
5. Method according to claim 4 wherein said gap is changed automatically in dependence upon said deviations.

References Cited

UNITED STATES PATENTS

| | | | |
|---|---|---|---|
| 3,434,945 | 3/1969 | Schmitt et al. | 204—245 |
| 3,464,903 | 9/1969 | Shaw | 204—99 |
| 3,485,727 | 12/1969 | Uhrenholdt | 204—228 |

FOREIGN PATENTS 243,826  12/1965  Austria.

TA HSUNG TUNG, Primary Examiner

U.S. Cl. X.R.

204—1, 98, 228